United States Patent [19]

Halpern

[11] Patent Number: 4,740,548

[45] Date of Patent: Apr. 26, 1988

[54] POLYIMIDE THERMOPLASTIC PROTECTED FROM DISCOLORATION DURING THERMAL PROCESSING

[75] Inventor: Yuval Halpern, Skokie, Ill.

[73] Assignee: Borg-Warner Chemicals, Inc., Parkersburg, W. Va.

[21] Appl. No.: 49,872

[22] Filed: May 14, 1987

Related U.S. Application Data

[63] Continuation-in-part of Ser. No. 929,445, Nov. 12, 1956, Pat. No. 4,695,601.

[51] Int. Cl.[4] .............................................. C08K 5/07
[52] U.S. Cl. .................................... 524/359; 524/356; 524/361; 524/362
[58] Field of Search ................ 524/356, 359, 361, 362

[56] References Cited

U.S. PATENT DOCUMENTS 3,845,162  10/1974  Hess et al. ............................ 260/863
4,508,861  4/1985  Avakian ............................... 524/101

FOREIGN PATENT DOCUMENTS 0176811  9/1985  European Pat. Off. .

Primary Examiner—Lewis T. Jacobs
Attorney, Agent, or Firm—Emily A. Richeson

[57] ABSTRACT

A thermoplastic composition is provided which comprises a polyimide with an effective amount of an alpha-hydroxyketone such as benzoin to prevent discoloration on thermal processing.

11 Claims, No Drawings

POLYIMIDE THERMOPLASTIC PROTECTED FROM DISCOLORATION DURING THERMAL PROCESSING

The present application is a continuation-in-part of application Ser. No. 929,445, filed Nov. 12, 1986, now U.S. Pat. No. 4,695,601.

BACKGROUND OF THE INVENTION

The present invention relates generally to aromatic polyimide thermoplastics protected against discoloration during processing, and to a method for suppressing discoloration of aromatic polyimide compositions.

Discoloration is generally viewed as a detriment to a plastic, since it spoils its appearance, creates the impression of nonuniformity, and is often associated by the customer with inferior properties, whether or not it is associated with actual degradation of the polymer. For some applications such as optical elements, coatings for solar cells, and the like, discoloration seriously impedes or prevents the proper functioning of a device made from a polyimide plastic. For other applications, such as for construction of aircraft interiors, discoloration is primarily an aesthetic detriment.

The art of compounding of plastics has led to a variety of stabilizers and discoloration preventatives, which tend to differ from plastic to plastic. In the foregoing and following discussion, the terms "preventing", "prevention" and "preventative" are used in a relative sense rather than in an absolute sense, i.e. by prevention is meant suppression relative to an untreated control sample.

Vinyl polymers such as PVC are successfully prevented from yellowing by alkyltin compounds, barium-cadmium salts, and calcium-zinc salt mixtures. These stabilizers are believed to retard formation of conjugated double bonds which cause color. In polyolefins (which can degrade without a great deal of discoloration), the required stabilization is more directed to preventing autooxidation with loss of mechanical properties than to preventing discoloration. Various phenols in combination with phosphites or organic sulfides are commonly used for this purpose. In styrenic polymers such as ABS, it is also common practice to use tertiarybutylphenols plus phosphite. Here again, much of the concern is protection against loss of mechanical properties, although prevention of discoloration is sometimes a consideration. In nylon 6,6, especially for fiber use, discoloration during thermal processing is a serious problem and discoloration preventatives such as phenylphosphinic acid are used. In polyester fiber and film, various phosphorus additives are used to prevent discoloration.

The development of newer thermoplastics processed at high temperatures (such as polyimides) has imposed more stringent needs for improved means for preventing degradation, including that part of degradation which manifests itself as discoloration. The structures of these high temperature thermoplastics and their modes of degradation are different from the earlier plastics mentioned above. Most of these high-performance thermoplastics have heteroatoms (such as nitrogen in the case of polyimides) in the backbone of the polymer, which makes their chemistry quite different from the chemistry of purely carbon-chain polymers. Consequently, it has not been possible to predict whether stabilizers useful in polymers mixed, molded or extruded at lower temperatures, such as below 500° F., would be useful in polymers typically processed at higher temperatures.

This requirement for discoloration preventatives in the processing (hot mixing, molding, and extrusion) of thermoplastics is also quite different from the requirement for stabilizers intended to protect the plastic during its service life, which for obvious reasons must be at temperatures lower than its processing temperature. Those stabilizers which are known for protection against atmospheric oxidation and photodegradation at the service temperatures of the plastic are generally found to be disappointing as high-temperature thermal processing stabilizers, and particularly disappointing in regard to prevention of discoloration during thermal processing.

The polyimide thermoplastics constitute an important class of thermoplastics which are processed at high temperatures. For example, polyimide molding resins are typically molded at 680° to 800° F. (340° to 425° C.). Polyimides which are applied as coatings in the form of polyamic acids are typically heated to about 300° C. to convert the amic acid structures to imide structures. In either case, some coloration usually develops during this thermal treatment.

Various efforts have been made to stabilize polyimides against deterioration of mechanical properties caused by heat. For instance Avakian, U.S. Pat. No. 4,508,861 (Apr. 2, 1985) teaches the use of hindered phenols, aryl phosphonites, organic phosphites, thioesters, and mixture thereof, to stabilize the mechanical properties of polyetherimides, a subclass of polyimides. However, this teaching is silent regarding the color effects of such stabilizers. Avakian does refer to prior art stabilizers for other polymers as being incompatible with polyimides and causing discoloration (see Col. 1, Lines 52–55).

It has now unexpectedly been found that compounds of the alpha-hydroxyketone class, which includes the benzoins, are effective discoloration preventatives for polyimide thermoplastics. This finding is quite surprising since these alpha-hydroxyketones are themselves not exceptionally stable to heat. For example, benzoin was reported by Lachman, J. Am. Chem. Soc. 46, 717–718 (1924) to decompose at 300° C. (572° F.) to benzaldehyde and other products.

It was disclosed in European Patent Application No. 0 176 811 (date laid open: 4.9.86) that certain benzoins are stabilizers for ABS, an acrylonitrile/styrene/butadiene graft copolymer. However, this European application indicates that the anti-discoloration action diminishes rapidly as the processing temperature is raised and becomes quite poor around 300° C. (572° F.). (See FIG. 1 in the cited application).

SUMMARY OF THE INVENTION

The present invention is a thermoplastic composition comprising a polyimide and, as an additive to suppress discoloration from thermal processing, an effective amount of an alpha-hydroxyketone, preferably having at least one hydrogen atom on the hydroxyl-bearing carbon atom of said ketone.

The present invention also makes available a method for suppressing discoloration of polyimide compositions.

DETAILED DESCRIPTION OF THE INVENTION

The composition of the present invention comprises a polyimide thermoplastic and an effective discoloration-preventing amount of an alpha-hydroxyketone, preferably having at least one hydrogen atom on the hydroxyl-bearing carbon atom of said ketone.

The polyimide thermoplastics comprise those thermoplastics having repeating units of the structure

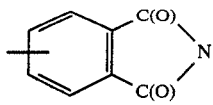

Many exemplifications of this class of polyimides exist and are listed in the article entitled "Polyimides" in the Kirk-Othmer Encyclopedia of Chemical Technology, Vol. 18, John Wiley & Sons, New York, 1982, pp. 704-719, in particular in tables 4 and 5 (pp. 712-716) which list the repeating units of the polymer backbone, and table 6 (p. 717) which lists the trade names, suppliers, compositions, and uses of commercially significant polyimides.

The class of thermoplastic polyimides also includes several subclasses, one such subclass being the poly(imide-amides) containing repeating aromatic amide units as well as aromatic imide units, examples of which are listed in table 5 of the article cited above.

Another subclass is the polyetherimides, which are polyimides with repeating units of aromatic ether structures in the same polymer chain as the imide units. A particularly important member of the polyetherimides is the polyetherimide having its repeating unit of the following structure:

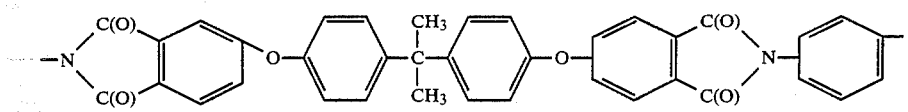

A leading commercial embodiment is General Electric Company's ULTEM ® resin. This is a preferred polyimide component of the compositions of the invention, by reason of the excellent balance of physical properties as well as good color achievable by means of the invention.

Another important polyimide is a condensation product of pyromellitic dianhydride and bis(4-aminophenyl) ether, usually processed first in the form of an amic acid precursor and then converted thermally to the final polyimide structure by thermal ring closure. An example of such a resin is E. I. DuPont's KAPTON ® resin.

The term "converted thermally" as used herein is meant to encompass the thermal step of conversion of a preformed amic acid to a polyimide. The term "thermoplastic" is meant to apply to such polyimides although those skilled in the art will recognize that such polyimides as KAPTON ® resin are usually not processed thermoplastically once they are converted from the amic acid precursor as the precursor is more conveniently processed thermoplastically or by solution coating. Technically, however, such resins are thermoplastics because they are not covalently crosslinked.

The discoloration preventative used in the composition and method of the invention is an alpha-hydroxyketone, preferably with at least one hydrogen atom on the hydroxylated carbon atom. The compounds suitable for use in the invention may be represented by the structure CRR"(OH)C(O)R' where R,R, and R" are independently selected from the group of hydrocarbyl radicals and where R and R" can also be hydrogen, with R" preferably being hydrogen. Since the function of the compounds depends on the critical group —C(OH)-C(O)—, wide variations of R and R' are permissable and these radicals, if hydrocarbyl, can be of many types, such as alkyl, alkenyl, cycloalkyl, cycloalkenyl, haloalkyl, aryl, substituted aryl, and heterocyclic aliphatic or aromatic radicals. Examples of such ketones include butyroin, 5-hydroxyoctan-4-one, 9-hydroxyhexadecan-8-one, 1,4-diphenyl-3-hydroxybutan-2-one, 1,4-dicyclohexyl-3-hydroxybutan-2-one, 1,4-bis(4-methoxyphenyl)-3-hydroxybutan-2-one, 1,4-di-2-pyridyl-3-hydroxybutan-2-one, omega-hydroxy-2,4,5-trichloroacetophenone, 1,4-dichloro-3-hydroxybutan-2-one, 1,2-bis(2-oxacyclohex-3-enyl)-2-hydroxyethan-1-one, 4-hydroxyhexa-1,5-diene-3-one, 1,4-dicyclohexen-4-yl-3-hydroxybutan-2-one, and, in the less preferred category where R" does not equal hydrogen, alpha-phenylbenzoin.

Non-interfering substitutents may be present, i.e. substitutents which do not cause instability or incompatibility with the resin. Such substitutents will be readily evident to those skilled in the art. Examples of permissable substitutents are: hydrocarbyl, hydrocarbyloxy, halogen, hydrocarbylthio, and carbalkoxycarbonyl. An example of an interfering substituent would be a second hydroxy; for instance, dihydroxyacetone is incompatible and insufficiently stable. These skilled in the art would recognize that other interfering groups would be those that react with the ketone or hydroxy functional groups or those which are thermally unstable such as hydrazo. The two groups R and R' can be conjoined to form a ring, as in 2-hydroxycyclohexanone, or can be members of a polymer chain such as the linear acyloin condensation product of a long chain dialdehyde such as the acyloin polymer from terephthalic or isophthalic dialdehyde.

Preferred R, R', and R" groups are alkyl of from 2 to 20 carbon atoms, phenyl, methoxyphenyl, or halophenyl. Where R and R' are the same group and R" is hydrogen, such compounds are readily made in one step from available aldehydes by the well known acyloin condensation reaction. Especially preferred because of its ready availability and good performance is benzoin, in which R and R' are both phenyl. The two groups R and R' need not be identical; for instance hydroxypropiophenone (R=methyl, R'=phenyl) is an effective compound for use in the invention.

It is also preferred that the alpha-hydroxyketone be one which is substantially colorless, so as not to obscure the color benefit intended from its use. An example of an undesirably colored ketone is pivaloin, which is orange and of marginal utility therefore. Other examples will be obvious to one skilled in the art. For example alpha-hydroxyketones with known chromophoric groups such as azo groups would be undesirable for the reason given. The term "substantially colorless" is intended to allow for a pale color which will be considered unobjectionable at the use dilution in the resin.

An effective amount of the discoloration preventing additive to be used in the compositions and method of the invention is that which gives the desired color benefit in the polyimide thermoplastic, and is preferably in the range of 0.05 to 5% by weight. Lesser amounts may not produce enough color benefit; greater amounts may be wasteful and may exude, produce odor, or plasticize excessively. As will be recognized by those skilled in the art of plastics compounding, the best amount to be used in any given case will be determined readily, amounts near the low end of the stated range being used where color standards are lenient, processing conditions relatively mild, or the resin relatively insensitive to discoloration, whereas amounts near the high end of the stated range would be used where color requirements are demanding, processing conditions relatively stringent (exceptionally high temperature and/or long time), and the resin relatively sensitive to discoloration.

The compsitions of the invention also encompass blends of the polyimide thermoplastics with each other and with other polymers and copolymers, such as polysulfones, polyamides, polyethers, and polyesters.

Likewise other processing ingredients may be included, as will be evident to those skilled in the art of polymer compounding. Such ingredients include other stabilizers, such as those described in U.S. Pat. No. 4,508,861 cited above, processing aids, flow improvers, mold release agents, antistatic angents, colorants, titanium dioxide, odorants, electrical conductivity modifiers, fillers, reinforcing agents, impact modifiers, fire retardants, and plasticizers. In polyimide thermoplastics, reinforcing fillers may be used, such as glass fibers and spheres, carbon fibers, and polytetrafluoroethylene.

In the method aspect of the invention, the thermoplastic resin and the discoloration-preventing additive are mixed by any of a variety of techniques, such as mixing in a Banbury mixer, dry blending, melt blending, extrusion, or milling. In the case of those polyimides such as KAPTON ® resin which are processed as the amic acid precursor and then thermally converted to the polyimide, the discoloration-preventing additive is most conveniently admixed at the amic acid stage so that it is present during the thermal conversion to polyimide.

In the preferred method of the invention, the suppression of discoloration of the polyimide thermoplastic from thermal processing at high temperature, such as above 550° F. and more specifically above 600° F., is best accomplished by admixing the discoloration-preventing additive of the invention in an effective amount before much thermal discoloration has occurred. This admixing may be accomplished using any of the mixing methods named above. For instance, the mixing of the color preventative can be done near the low end of the acceptable processing temperature range, or very quickly if at the high end of this range. However, even if some discoloration has already occurred, admixing the additive of the invention can lighten it somewhat or at least prevent further darkening.

The practice of the invention will be better understood by the following examples. In the following examples the term "lightness" refers to the attribute of color perception by which an object is judged to reflect more or less light than another object. The lightness measurements were carried out by molding flat plates of polymer and evaluating their lightness using a Labscan 2 Spectrocolorimeter (manufactured by the Hunter Associates Laboratory, Inc.). The reflectance in the visual wave length range is measured and expressed on a scale of from 0 to 100, where 0 is total blackness (no reflectance) and 100 is equal to the standard for total whiteness. The larger the number, the lighter the plastic. The method and principles are discussed by Billmeyer and Saltzman in "Principles of Color Technology," Wiley-Interscience, New York, NY (1966), chapters 1 and 2.

Commercial polyimide thermoplastic (ULTEM ® resin, grade 1000, structure as defined for ULTEM ® resin above), was injection molded at 650° F. with and without admixing 0.5 parts of benzoin per hundred parts of resin. The lightness of the molded plates was 62 with the benzoin admixed, and 51 without the benzoin.

In like manner, the admixing of 0.2 parts of benzoin, or 0.5 parts of anisoin may lessen the color developed in processing of ULTEM ® polyimide thermoplastic (structure as defined above) at 700° F. Similarly, the admixing of 1 part of benzoin or anisoin to the amic acid precursor may lighten the color developed in a KAPTON ® polyimide (structure as defined above) made by thermal conversion of the polyamic acid precursor at 300° C.

These examples are presented for purposes of illustration and are not intended to be limiting.

What I claim is:

1. A thermoplastic composition comprising a polyimide and an alpha-hydroxyketone, said ketone being present in an amount sufficient to suppress discoloration of the composition during processing.

2. A thermoplastic composition comprising a polyimide and an alpha-hydroxyketone having at least one hydrogen atom on the carbon bearing the hydroxyl group, said ketone being present in an amount sufficient to suppress discoloration of the composition during processing.

3. The composition of claim 2 where the ketone is substantially colorless.

4. The composition of claim 2 where the ketone is benzoin.

5. The composition of claim 2 where the ketone is anisoin.

6. The composition of claim 2 where the ketone is 4,4'-dichlorobenzoin.

7. The composition of claim 2 where the polyimide has the structure

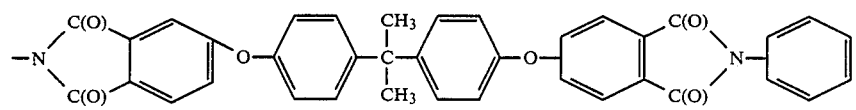

8. The composition of claim 2 where the polyimide is a condensation polymer of pyromellitic dianhydride and bis(4-aminophenyl) ether.

9. A method for the prevention of discoloration of a polyimide thermoplastic during thermal processing, said method comprising mixing into said thermoplastic an effective amount of an alpha-hydroxyketone having at least one hydrogen atom on the hydroxyl-bearing carbon atom of said ketone.

10. The method of claim 9 where the ketone is benzoin.

11. The method of claim 10 where the ketone is benzoin and the polyimide has the structure.

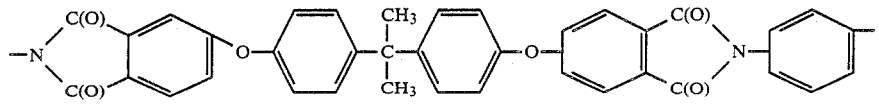

* * * * *